United States Patent
Senge

(10) Patent No.: US 11,007,809 B2
(45) Date of Patent: May 18, 2021

(54) IDENTIFICATION CARD WITH THERMOCHROMIC WINDOW

(71) Applicant: HID Global Rastede GmbH, Rastede (DE)

(72) Inventor: Carsten Senge, Bad Zwischenahn Bloh (DE)

(73) Assignee: HID Global Rastede GmbH, Rastede (DE)

( * ) Notice: Subject to any disclaimer, the term of this patent is extended or adjusted under 35 U.S.C. 154(b) by 0 days.

(21) Appl. No.: 16/621,280

(22) PCT Filed: Jun. 21, 2018

(86) PCT No.: PCT/EP2018/066560
§ 371 (c)(1),
(2) Date: Dec. 11, 2019

(87) PCT Pub. No.: WO2019/002084
PCT Pub. Date: Jan. 3, 2019

(65) Prior Publication Data
US 2020/0198390 A1    Jun. 25, 2020

(30) Foreign Application Priority Data
Jun. 28, 2017  (EP) .................................. 17178488

(51) Int. Cl.
*B42D 25/378* (2014.01)
*B42D 25/23* (2014.01)
(Continued)

(52) U.S. Cl.
CPC ........... *B42D 25/378* (2014.10); *B42D 25/23* (2014.10); *B42D 25/351* (2014.10); *G06K 19/07773* (2013.01)

(58) Field of Classification Search
CPC .... B42D 25/378; B42D 25/23; B42D 25/351; G06K 19/07773
(Continued)

(56) References Cited

U.S. PATENT DOCUMENTS

| 2014/0138444 A1 | 5/2014 | Riedl | |
| 2015/0220057 A1* | 8/2015 | Tziovaras | ............ G03H 1/0248 359/2 |

FOREIGN PATENT DOCUMENTS

| CN | 1285789 A | 2/2001 |
| CN | 101120139 A | 2/2008 |

(Continued)

OTHER PUBLICATIONS

"European Application Serial No. 17178488.7, Extended European Search Report dated Sep. 20, 2017", 5 pgs.
(Continued)

*Primary Examiner* — Justin V Lewis
(74) *Attorney, Agent, or Firm* — Schwegman Lunberg & Woessner, P.A.

(57) ABSTRACT

The present disclosure refers to a method for manufacturing a secured window in an identification card. The method comprising embedding information in a transparent window of the identification card and covering the embedded information with a thermochromic layer on a first side of the transparent window. The thermochromic layer is configured to become substantially transparent when subjected to a level of heat greater than a determined threshold value. In addition the method comprises the step of covering a second side of the transparent window, opposite to the first side, with a further thermochromic layer, the further thermographic layer being configured to become substantially transparent when subjected to a level of heat greater than the determined threshold value, such that the embedded information becomes visible through the transparent window (Continued)

when both sides of the window are exposed to the level of heat greater than the determined threshold value.

18 Claims, 3 Drawing Sheets

(51) Int. Cl.
   *B42D 25/351* (2014.01)
   *G06K 19/077* (2006.01)
   *B42D 25/36* (2014.01)

(58) Field of Classification Search
   USPC .................. 283/67, 70, 72, 74, 94, 98, 901
   See application file for complete search history.

(56) References Cited

FOREIGN PATENT DOCUMENTS

| | | |
|---|---|---|
| CN | 102905910 A | 1/2013 |
| CN | 102958705 A | 3/2013 |
| CN | 103648790 A | 3/2014 |
| CN | 104540685 A | 4/2015 |
| CN | 106064543 A | 11/2016 |
| DE | 102011108527 A1 | 1/2013 |
| EP | 3421253 A1 | 1/2019 |
| JP | 2011134194 A | 7/2011 |
| WO | WO-2008105577 A1 | 9/2008 |
| WO | WO-2014029686 A1 | 2/2014 |
| WO | WO-2019002084 A1 | 1/2019 |

OTHER PUBLICATIONS

"International Application Serial No. PCT/EP2018/066560, International Search Report dated Aug. 21, 2018", 3 pgs.

"International Application Serial No. PCT/EP2018/066560, Written Opinion dated Aug. 21, 2018", 5 pgs.

"Chinese Application Serial No. 201880044262.4, Office Action dated Sep. 15, 2020", w/ English translation, 17 pgs.

"Chinese Application Serial No. 201880044262.4, Office Action dated Mar. 17, 2021", w/ English Translation, 17 pgs.

* cited by examiner

A)

B)

IDENTIFICATION CARD WITH THERMOCHROMIC WINDOW

CROSS-REFERENCE TO RELATED APPLICATION(S)

This application is a national stage application of International PCT patent application no. PCT/EP2018/066560, filed Jun. 21, 2018, titled "Identification Card with Thermochromic Window," which claims priority to European patent application no. 17178488.7, filed Jun. 28, 2017, each of which is hereby incorporated by reference herein in its entirety.

TECHNICAL FIELD

The present disclosure relates to a security feature in an identification card.

BACKGROUND OF THE PRESENT DISCLOSURE

It is known to use a thermochromic effect to make information that is embedded in the identification card appear upon thermal activation of the identification card. One such product is offered for sale under the brand name FEEL®-ID. This product departs from an identification card in which an information is embedded. This information is overprinted with a thermochromic ink which is opaque under normal use conditions. Upon application of heat to the thermochromic ink, the opacity changes, i.e., the thermochromic ink becomes transparent and the hidden information underneath is displayed.

WO 2014/029686 A1 refers to a security document with a hologram in a visually changeable window as a novel security element, and also to a method for producing the same. The document of security disclosed therein comprises at least one window formed from a multilayer assembly. The multilayer assembly has at least one layer comprising at least one photopolymer and incorporating at least one hologram and at least one transparent, optically switchable layer which becomes non-transparent by means of heat or irradiation.

DE 10 2011 108527 A1 shows a data carrier card comprising a card body including one or several foils and a security thread integrated in the card body. At least one of the foils is manufactured by coextrusion and has at least two strips lying side by side in the area dimension. At least one strip is a thread strip which differs in at least one material property from the bordering strips. At least one printed layer is applied to the thread strip as an overprint or underprint. The thread strip forms by cooperation with the at least one printed layer the security thread or a part of the security thread.

Nowadays, there is an increased interest for security features in identification cards, which among others allow to check the authenticity of the card and at the same time protect against unauthorized copy. One popular security feature involves using a see through window in the identification card.

Hence the present disclosure aims to provide an identification card with a security feature that is highly secure against fraud and gives an attractive visual appearance.

SUMMARY OF THE PRESENT DISCLOSURE

In a first aspect, the present disclosure provides a method for manufacturing a secured window in an identification card, comprising embedding information in the identification card; covering the embedded information with a thermochromic layer; whereby the thermochromic layer becomes substantially transparent when subjected to a level of heat greater than a determined threshold value. The method further comprises providing a transparent window in the identification card; embedding the information in the transparent window, whereby a first side of the transparent window is covered in the step of covering the embedded information with the thermochromic layer; and covering a second side of the transparent window, opposite to the first side, with a further thermochromic layer, such that the embedded information becomes visible through the window when both sides of the window are exposed to the level of heat greater than the determined threshold value.

In a preferred embodiment a thermochromic layer's color is black when the level of heat is inferior or equal to the determined threshold value.

In a further preferred embodiment, the method further comprises overprinting a pattern on at least a part of the thermochromic layer on at least one side of the transparent window with color shifting ink with non-mineral pigment, wherein the color shifting ink with non-mineral pigment is visible over the thermochromic layer when this is dark colored, i.e., when the level of heat is inferior or equal to the determined threshold value, and the color shifting ink with non-mineral pigment appears substantially invisible when the thermochromic layer is exposed to the level of heat greater than the determined threshold value.

In a second aspect, the present disclosure provides an identification card provided with a secured transparent window, comprising embedded information in the identification card; a first thermochromic layer covering the embedded information; whereby the thermochromic layer becomes substantially transparent when subjected to a level of heat greater than a determined threshold value. The identification card further comprises a transparent window in the identification card, whereby the embedded information is in the transparent window; whereby a first side of the transparent window in covered by the first thermochromic layer; and a second thermochromic layer covering a second side of the transparent window, opposite to the first side, such that the embedded information becomes visible through the window when both sides of the window are exposed to the level of heat greater than the determined threshold value.

In a further preferred embodiment of the identification card, a thermochromic layer's color is black when the level of heat is inferior or equal to the determined threshold value.

In a further preferred embodiment of the identification card, the identification card further comprises on at least one side of the transparent window, on at least a part of the thermochromic layer, an overprinted pattern of color shifting ink with non-mineral pigment, wherein the color shifting ink with non-mineral pigment is visible over the thermochromic layer when this is dark colored, i.e., when the level of heat is inferior or equal to the determined threshold value, and the color shifting ink with non-mineral pigment appears substantially invisible when the thermochromic layer is exposed to the level of heat greater than the determined threshold value.

In a further preferred embodiment, the thermochromic layer comprises thermochromic ink which changes its color at about 30-35° C.

In another aspect, the present disclosure refers to a method for manufacturing a secured window in an identification card, the method comprising at least the method steps of:

providing a transparent window in the identification card and embedding information in the transparent window;

covering a first side of the transparent window and the embedded information with a thermochromic layer, the thermochromic layer becoming substantially transparent when subjected to a level of heat greater than a determined threshold value; and covering a second side of the transparent window, opposite to the first side, with a further thermochromic layer, the further thermographic layer being configured to become substantially transparent when subjected to a level of heat greater than the determined threshold value, such that the embedded information becomes visible through the transparent window when both sides of the transparent window are exposed to the level of heat greater than the determined threshold value.

In another aspect, the present disclosure refers to an identification card provided with a secured transparent window. The identification card comprises a transparent window and information embedded in the transparent window. A first thermochromic layer covers a first side of the transparent window and the embedded information. The first thermochromic layer is configured to become substantially transparent when subjected to a level of heat greater than a determined threshold value. A second thermochromic layer covers a second side of the transparent window, opposite to the first side. The second thermographic layer is configured to become substantially transparent when subjected to a level of heat greater than the determined threshold value such that the embedded information becomes visible through the transparent window when both sides of the transparent window are exposed to the level of heat greater than the determined threshold value.

BRIEF DESCRIPTION OF THE DRAWINGS

The present disclosure will be better understood through the description of preferred embodiments, and in reference to the drawings, wherein.

DETAILED DESCRIPTION

Figure 1:
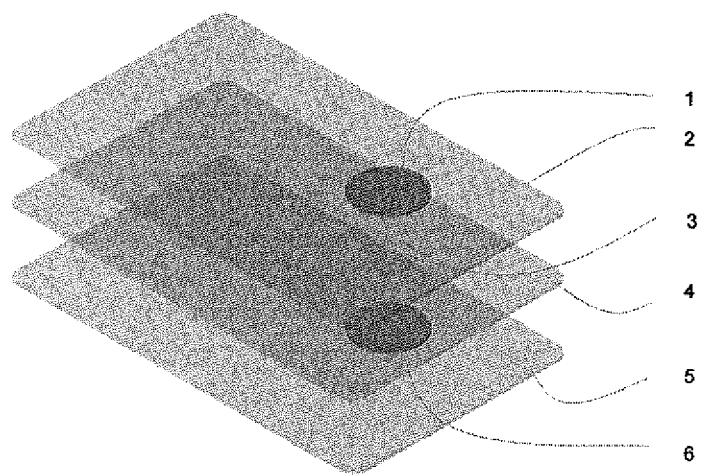
FIG. 1 shows an example embodiment of an identification card according to the present disclosure.

FIG. 1 shows an example embodiment of an identification card according to the present disclosure.

The identification card comprises a core layer 4, which may be a pre-laminated layer, and a first transparent film or foil 2 and a second transparent film or foil 5 arranged respectively on opposite sides of the core layer 4. The core layer 4 may comprise electronic components, such as for example an antenna or a transponder—no electronic components are shown in FIG. 1 for a better readability.

The core layer 4 comprises a transparent window 3. The window may comprise any information (not shown in FIG. 1) that may be seen visually by looking through the window 3. The information may be of graphical nature and/or imprinted on the window 3. The information may also be a feature of the core layer that would be positioned in an aperture of the window 3, such as for example an electronic component, which would hence become visible when one looks through the window 3. The information may alternatively also be superposed on a side of the window, effectively coming from a carrier that is distinct from the window of the core layer 4.

The first transparent foil 2 and the second transparent foil 5 respectively comprise a first thermochromic layer 1 and a second thermochromic layer 6. Both first and second thermochromic layers 1 and 6 may be seen as elements of delimited sizes, partly covering a surface of the first and second transparent foils respectively. Preferably each of the first and second thermochromic layers 1 and 6 have a size and shape that at least covers a side of the window 3. The first and second thermochromic layers 1 and 6 are positioned on their respective carrier foils in such a manner that they cover respective sides of the window 3 when the core layer 4 and the foils 2 and 5 are assembled to become an identification card.

As already hinted in the context of prior art, the thermochromic layers are opaque under normal use conditions. Upon application of heat to the thermochromic layers, the opacity changes, i.e., the thermochromic layers become transparent and the information underneath, i.e., at the level of the window 3 is displayed, because there is a transparent visual path allowing to see through. Typically, the heat should exceed a determined threshold value for the desired effect of opacity change to occur.

In a preferred embodiment a thermochromic layer's color is black when the level of heat is inferior or equal to the determined threshold value.

In a preferred embodiment, the thermochromic ink changes its color at about 30-35° C., so it is black at normal room temperature, but can be changed with the "heat" of the human body.

In a preferred embodiment the thermochromic layers may comprise thermochromic paint.

In a preferred embodiment the thermochromic layer is a printed patch.

Figure 3:
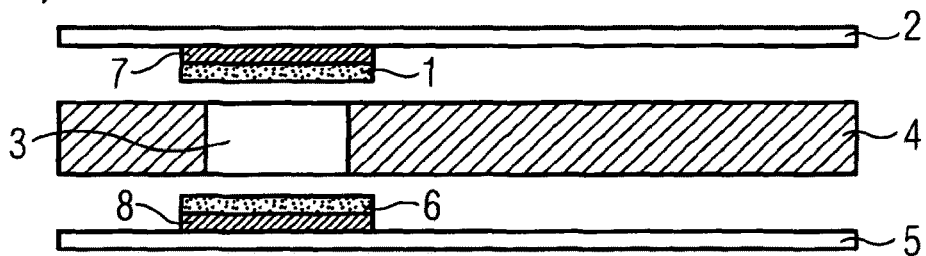
FIG. 3 shows a further example embodiment of an identification card in a sectional view according to the present disclosure, involving color shifting ink.
Figure 3:
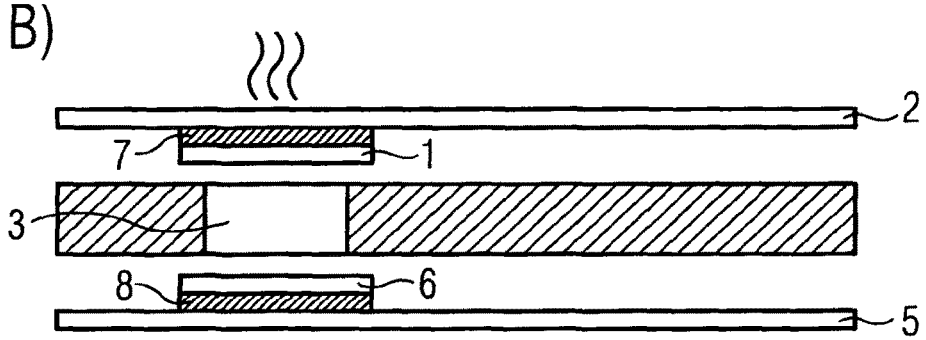

In a further preferred example embodiment as shown in the sectional view of an identification card in FIG. 3, a pattern made with layers 7 and 8 of a color shifting ink with non-mineral pigment, respectively between the first thermochromic layer 1 and the first transparent film 2, and between the second thermochromic layer 6 and the second transparent film 5.

In the upper part of FIG. 3, labelled A, the first and the second thermochromic layers 1 and 6 are at a temperature that lies below the determined threshold value, rendering them opaque. This is illustrated by the black texture of the thermochromic layers in FIG. 3, part A. In this situation, the color shifting ink is visible over the respective thermochromic layers, i.e., when seen respectively from above and below the identification card.

When the temperature of the first and the second thermochromic layers 1 and 6 is above the determined threshold value, these become transparent, and the color shifting ink is then invisible. This is represented by the absence of any texture in the thermochromic layers 1 and 6 in FIG. 3, part B, which is illustrated in the below part of FIG. 3.

The identification card according to the present disclosure is particularly safe as the information hidden at the level of the window is covered from both sides. If only one side had been covered, it would possibly still be possible to illuminate the uncovered side of the window and see the information by an effect of the reflected light.

The identification card according to the present disclosure is esthetically pleasing as the see-through window 3 may instantly be produced by means of application of heat only. This allows for a large variety of types of information to be included at the level of the window 3, including 3-dimensional shapes, partly translucid objects, etc.

In a preferred embodiment, the core layer 4 is opaque, and comprises the window 3 as an aperture therein, the first and second transparent foils 2 and 5 carry on their sides oriented to the core layer 4, respectively the first and second thermochromic layers 1 and 6, whereby at least one of the thermochromic layers is imprinted with the information, for example an artwork, on the side oriented to the window 3.

Figure 4:
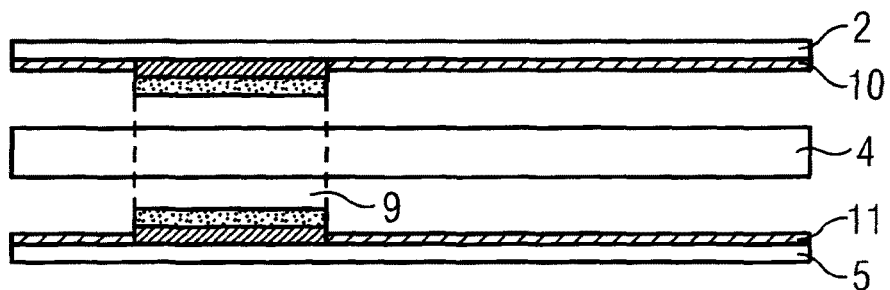
FIG. 4 contains a further example embodiment of an identification card involving a transparent core, in a sectional view, according to the present disclosure, and FIG. 5 contains a further example embodiment of an identification card involving a transparent core covered on each of its sides by an opaque layer, in a sectional view, according to the present disclosure.

In a further preferred embodiment, shown in the sectional view of FIG. 4, the core layer 4 is transparent and doesn't have any window that is explicitly formed therein, but rather comprises a zone 9 of the core layer 4, delimited in the figure by dotted lines, that is defined as a window 3, which is transparent just the same as the remaining core layer 4 around it. The first transparent foil 1 and the second transparent foil 5 may be covered by a opaque layer of paint 10 and 11 respectively.

In a further preferred embodiment, the information and the thermochromic layer are deposited directly on each side of the window 3. In this case the window must be delimited on each of its sides by a solid transparent surface.

Figure 5:
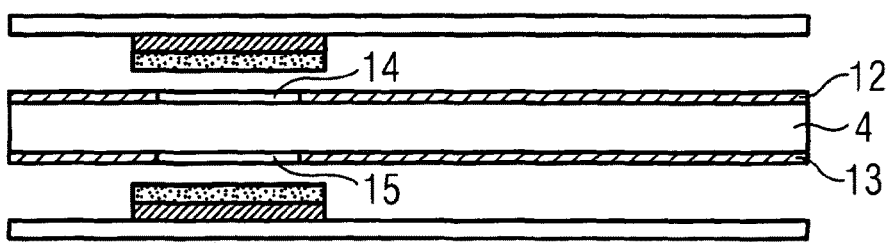

In a further preferred embodiment represented in the sectional view of FIG. 5, the core layer 4 may for example be of a transparent material and entirely covered on each side by a layer of opaque paint 12 and 13, or an opaque foil with a partial opening, except for a part 14 and 15 on each side of the core layer 4 corresponding to the window 3. The information may then be deposited directly on at least one of the surfaces of the window 3, and both surfaces of the window 3 subsequently covered by the thermochromic layer. The finished core layer product may then be covered on each side by a transparent foil as a means of protection.

Figure 2:
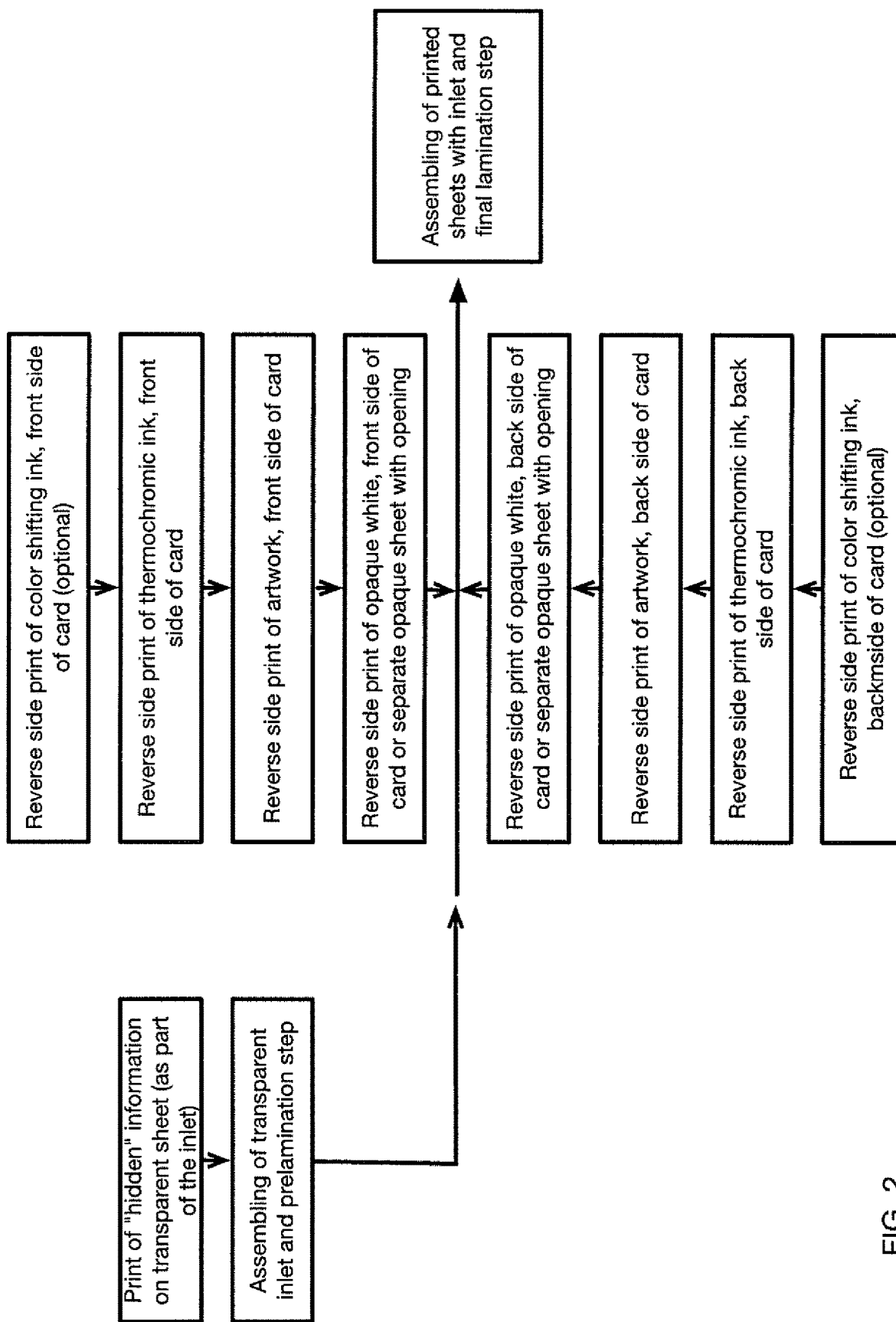
FIG. 2 contains a flowchart illustrating an example embodiment of a method for manufacturing a secured window in an identification card according to the present disclosure.

Turning now to FIG. 2, this contains a flowchart illustrating an example embodiment of a method for manufacturing a secured window in an identification card according to the present disclosure. The method starts of by the step of printing "hidden" information on a transparent sheet—as part of the inlet for the identification card—thereby embedding information in the transparent window of the identification card. This is followed by an assembling of the transparent inlet and a prelamination step.

FIG. 2 then shows a reverse side print of an opaque white print which may optionally be executed on the front side and/or back side of the card, or on a separate opaque sheet with opening.

This is followed by a reverse side print of artwork which is done on the front side of the card and on the back side of the card.

Then a reverse side print of thermochronnic ink is executed on the front side window and the back side window, effectively covering the embedded information with a thermochromic layer.

Subsequently and optionally, there is a step of side print of color shifting ink on the front side of the card and/or the back side of the card. Eventually the printed sheets are assembled with the inlet and a final lamination step takes place.

The present disclosure is not limited to the described examples, and variations which fall in the scope of the appended claims may be executed by the person skilled in the art.

LIST OF REFERENCES 1 first thermochromic layer
2 first transparent foil
3 transparent window
4 card core
5 second transparent foil
6 second thermochromic layer
7 layer of a color shifting ink
8 layer of a color shifting ink
9 zone of core layer defining a window
10 opaque layer
11 opaque layer
12 opaque paint
13 opaque paint

The invention claimed is:

1. A method for manufacturing a secured window in an identification card, the method comprising:
providing a transparent core layer for the identification card;
providing an opaque layer on a first side of the transparent core layer, the opaque layer having an opening therein defining a window of the transparent core layer;
embedding information in the window of the transparent core layer;
covering a first side of the window and the embedded information with a first thermochromic layer, the first thermochromic layer being configured to become substantially transparent when subjected to a level of heat greater than a determined threshold value.

2. The method of claim 1, further comprising overprinting a pattern on at least a part of the first thermochromic layer with color shifting ink with non-mineral pigment, wherein the color shifting ink with non-mineral pigment is visible over the first thermochromic layer when the first thermochromic layer is exposed to a level of heat inferior or equal to the determined threshold value, and the color shifting ink with non-mineral pigment appears substantially invisible when the first thermochromic layer is exposed to the level of heat greater than the determined threshold value.

3. The method of claim 1, further comprising covering a second side of the window, opposite to the first side, with a second thermochromic layer, the second thermochromic layer being configured to become substantially transparent when subjected to the level of heat greater than the determined threshold value, such that the embedded information becomes visible through the window when both sides of the window are exposed to the level of heat greater than the determined threshold value.

4. The method of claim 3, further comprising overprinting a pattern on at least a part of the first thermochromic layer with color shifting ink with non-mineral pigment, wherein the color shifting ink with non-mineral pigment is visible over the first thermochromic layer when the first thermochromic layer is exposed to a level of heat inferior or equal to the determined threshold value, and the color shifting ink with non-mineral pigment appears substantially invisible when the first thermochromic layer is exposed to the level of heat greater than the determined threshold value.

5. The method of claim 3, wherein a color of at least one of the first thermochromic layer or second thermochromic layer is black when the level of heat is inferior or equal to the determined threshold value.

6. The method of claim 4, further comprising overprinting a pattern on at least a part of the second thermochromic layer with a further color shifting ink with non-mineral pigment, wherein the further color shifting ink with non-mineral pigment is visible over the second thermochromic layer when the further thermochromic layer is exposed to the level of heat inferior or equal to the determined threshold value, and the further color shifting ink with non-mineral pigment appears substantially invisible when the second thermochromic layer is exposed to the level of heat greater than the determined threshold value.

7. An identification card provided with a secured transparent window, the identification card comprising:
   a transparent core layer;
   an opaque layer on a first side of the transparent core layer and having an opening therein defining a window of the transparent core layer;
   embedded information in the window of the transparent core layer;
   a first thermochromic layer covering a first side of the window and the embedded information, the first thermochromic layer being configured to become substantially transparent when subjected to a level of heat greater than a determined threshold value; and
   a second thermochromic layer covering a second side of the window, opposite to the first side, the second thermochromic layer being configured to become substantially transparent when subjected to the level of heat greater than the determined threshold value, such that the embedded information becomes visible through the window when both sides of the window are exposed to the level of heat greater than the determined threshold value.

8. The identification card of claim 7, wherein a color of at least one of the first or second thermochromic layers is black when the level of heat is inferior or equal to the determined threshold value.

9. The identification card of claim 7, wherein the identification card further comprises, on at least a part of the first thermochromic layer, an overprinted pattern of color shifting ink with non-mineral pigment, wherein the color shifting ink with non-mineral pigment is visible over the first thermochromic layer when the first thermochromic layer is exposed to a level of heat inferior or equal to the determined threshold value, and the color shifting ink with non-mineral pigment appears substantially invisible when the first thermochromic layer is exposed to the level of heat greater than the determined threshold value.

10. The identification card of claim 7, wherein at least one of the first or second thermochromic layers comprises thermochromic ink which changes color at 30-35° C.

11. The identification card of claim 9, wherein the identification card further comprises, on at least a part of the second thermochromic layer, an overprinted pattern of further color shifting ink with non-mineral pigment, wherein the further color shifting ink with non-mineral pigment is visible over the second thermochromic layer when the second thermochromic layer is exposed to the level of heat inferior or equal to the determined threshold value, and the further color shifting ink with non-mineral pigment appears substantially invisible when the second thermochromic layer is exposed to the level of heat greater than the determined threshold value.

12. An identification card provided with a secured transparent window, the identification card comprising:
   a transparent core layer;
   an opaque layer on a first side of the transparent core layer and having an opening therein defining a window of the transparent core layer;
   embedded information in the window of the transparent core layer; and
   a thermochromic layer covering a first side of the window and the embedded information, the thermochromic layer being configured to become substantially transparent when subjected to a level of heat greater than a determined threshold value.

13. The identification card of claim 12, wherein a color of the thermochromic layer is black when the level of heat is inferior or equal to the determined threshold value.

14. The identification card of claim 12, wherein the thermochromic layer comprises thermochromic ink which changes color at 30-35° C.

15. The identification card of claim 14, wherein the thermochromic layer is a printed patch.

16. The identification card of claim 12, wherein the identification card further comprises, on at least a part of the thermochromic layer, an overprinted pattern of color shifting ink with non-mineral pigment, wherein the color shifting ink with non-mineral pigment is visible over the thermochromic layer when the thermochromic layer is exposed to a level of heat inferior or equal to the determined threshold value, and the color shifting ink with non-mineral pigment appears substantially invisible when the thermochromic layer is exposed to the level of heat greater than the determined threshold value.

17. The identification card of claim 12, further comprising a transparent foil covering the thermochromic layer.

18. The identification card of claim 17, further comprising at least one of an antenna or transponder.

* * * * *